United States Patent
Kanazawa

(10) Patent No.: US 12,451,506 B2
(45) Date of Patent: Oct. 21, 2025

(54) STACK CASE

(71) Applicant: TOYOTA JIDOSHA KABUSHIKI KAISHA, Toyota (JP)

(72) Inventor: Hideyuki Kanazawa, Nagoya (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 533 days.

(21) Appl. No.: 18/067,845

(22) Filed: Dec. 19, 2022

(65) Prior Publication Data

US 2023/0282863 A1    Sep. 7, 2023

(30) Foreign Application Priority Data

Mar. 3, 2022    (JP) .................... 2022-032840

(51) Int. Cl.
*H01M 8/2475*    (2016.01)

(52) U.S. Cl.
CPC ...... *H01M 8/2475* (2013.01); *H01M 2250/20* (2013.01)

(58) Field of Classification Search
CPC ........... H01M 8/2475; H01M 2250/20; H01M 2220/20; H01M 50/204; H01M 50/209; H01M 50/271; H01M 50/249; H01M 8/247; H01M 8/0276; Y02E 60/50
See application file for complete search history.

(56) References Cited

U.S. PATENT DOCUMENTS

2018/0123149 A1*  5/2018  Nishiumi ............... H01M 8/24

FOREIGN PATENT DOCUMENTS

| CN | 113013446 A | * | 6/2021 | ........ H01M 8/04291 |
| DE | 102016115702 A1 | * | 4/2017 | ............ B60L 50/71 |
| JP | 2017074819 A | * | 4/2017 | ............ B60L 50/71 |
| JP | 2020077569 A | * | 5/2020 | |
| KR | 101526421 B1 | * | 6/2015 | .......... H01M 8/2475 |

* cited by examiner

*Primary Examiner* — Muhammad S Siddiquee
(74) *Attorney, Agent, or Firm* — SoraIP, Inc.

(57) ABSTRACT

A stack case houses a plurality of fuel cells in a stacked state, and includes a case main body, a lid, and a seal. The stack case is configured to be disposed in a vehicle such that a stacking direction is inclined downward with respect to a horizontal direction as a distance to the discharge pipe decreases and an upper surface of the case main body is inclined upward with respect to the horizontal direction as a distance to the discharge pipe decreases.

5 Claims, 4 Drawing Sheets

STACK CASE

CROSS-REFERENCE TO RELATED APPLICATION

This application claims priority to Japanese Patent Application No. 2022-032840 filed on Mar. 3, 2022, incorporated herein by reference in its entirety.

BACKGROUND

1. Technical Field

The present disclosure relates to a stack case that houses fuel cells in a stacked state.

2. Description of Related Art

Japanese Unexamined Patent Application Publication No. 2020-77569 (JP 2020-77569 A) discloses a technique of disposing a stack case to be inclined downward toward a discharge end in a structure in which generated water is discharged from the side end of the stack case housing a fuel cell stack. By using gravity, the generated water can be easily discharged.

SUMMARY

A structure in which an opening formed at a discharge end of a stack case is closed with a lid provided with a discharge pipe that discharges generated water may be employed. In such a structure, there is a need for a seal to be disposed between the opening and the lid to improve airtightness. However, in a case where rainwater and the like enters the upper surface of the stack case, the inclination may cause the water to move toward the discharge end and accumulate in the vicinity of the lid. There is a possibility that the seal deteriorates by the water.

A stack case according to an aspect of the present disclosure houses a plurality of fuel cells in a stacked state. The stack case includes a case main body having an opening formed at one end of the case main body in a stacking direction of the fuel cells, a lid configured to cover the opening and including a discharge pipe configured to discharge generated water from an interior of the case main body, and a seal disposed between the opening and the lid. The stack case is configured to be disposed in a vehicle such that a stacking direction is inclined downward with respect to a horizontal direction as a distance to the discharge pipe decreases and an upper surface of the case main body is inclined upward with respect to the horizontal direction toward the discharge pipe.

According to the aspect of the present disclosure, since the stacking direction is inclined to be displaced downward with respect to the horizontal direction as a distance to the discharge pipe decreases, the generated water can be easily discharged by gravity. Further, since the upper surface of the case main body is inclined to be displaced upward with respect to the horizontal direction as a distance to the discharge pipe decreases, the water accumulated on the upper surface of the stack case can be moved to an opposite end on an opposite side of the other end at which the opening is formed. Since water from accumulating in the vicinity of the lid can be curbed, deterioration of the seal can be suppressed.

In the aspect of the present disclosure, the stack case may be disposed in the vehicle such that a lower surface of the case main body is inclined downward with respect to the horizontal direction as a distance to the discharge pipe decreases. As a result, the stacking direction of the fuel cells can be inclined to be displaced downward with respect to the horizontal direction as a distance to the discharge pipe decreases.

In the aspect of the present disclosure, a thickness of a wall constituting the upper surface of the case main body in a vertical direction of the vehicle may increase as a distance to the discharge pipe decreases. As a result, the upper surface of the case main body can be inclined to be displaced upward with respect to the horizontal direction as a distance to the discharge pipe decreases.

In the aspect of the present disclosure, the case main body may be a cast product, and a draft angle may be formed in the interior of the case main body such that a vertical direction height of space of the interior increases as a distance to the discharge pipe decreases. When the stack case is disposed in the vehicle with an inclination angle with respect to the horizontal direction such that a position on a side of the discharge pipe is lower than the horizontal direction, an angle of the draft angle may greater than the inclination angle. As a result, the upper surface of the case main body by using the draft angle can be inclined.

In the aspect of the present disclosure, a rib extending in a direction crossing the stacking direction may be formed on the upper surface of the case main body. The rib may be configured such that a height of a portion of the rib is lower than a height of the other portion of the rib. A water drainage path can be formed by a portion in which the height of the rib is reduced.

Details and further improvements of the technique of the present disclosure are described below in Detailed Description of Embodiments.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

Example 1

Schematic Configuration of Fuel Cell System 1

Figure 1:
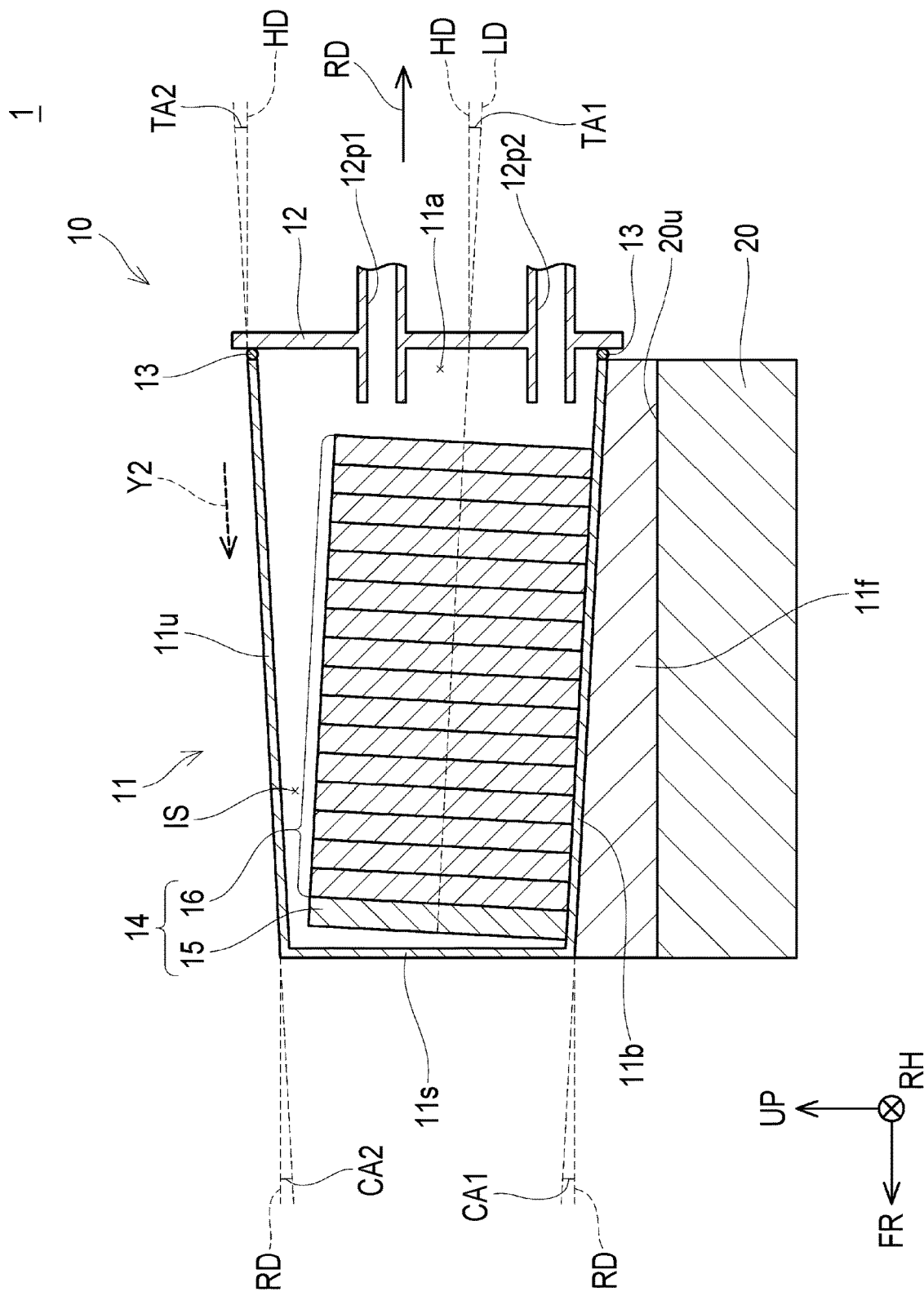
FIG. 1 is a cross-sectional view illustrating a schematic configuration of a fuel cell system.

FIG. 1 shows a cross-sectional view for illustrating a schematic configuration of a fuel cell system 1. The fuel cell system 1 is disposed in the interior of a front compartment (not shown) of a vehicle. The fuel cell system 1 includes a stack case 10 and a fuel cell power control unit (FCPC) 20. Description and illustration of other components in the front compartment will be omitted. Further, in each figure including FIG. 1, an arrow FR indicates a vehicle front direction, an arrow RH indicates a vehicle right direction, and an arrow UP indicates a vehicle upward direction. In subsequent figures, the meaning of the coordinate system is the same.

The FCPC 20 is a portion that monitors the voltage of a fuel cell stack 14 in the stack case 10 and controls a power generation state. The FCPC 20 is disposed in the front compartment such that an upper surface 20*u* of the FCPC 20 is parallel to a horizontal direction HD. The stack case 10 is disposed on the upper surface 20*u*. The stack case 10 includes a case main body 11, a stack manifold 12, a seal 13, and the fuel cell stack 14.

The fuel cell stack 14 is housed in an internal space IS of the case main body 11. The fuel cell stack 14 has a structure in which a plurality of fuel cells 16, which are rectangular plate members, are stacked. Specifically, an end plate 15 is positioned at the farthest end from the stack manifold 12. The fuel cells 16 are stacked such that the plane of the end plate 15 and the plane of the fuel cells 16 are parallel to each other. The direction perpendicular to the plane of each of the fuel cells 16 is a stacking direction LD.

The case main body 11 is a box-shaped member with one side open. The case main body 11 includes a support portion 11*f*, a lower wall 11*b*, an upper wall 11*u*, a side wall 11*s*, and an opening 11*a*. The opening 11*a* is an area without a wall. The opening 11*a* is formed at the end on the rearward side of the vehicle in the stacking direction LD.

The support portion 11*f* is a component that serves as a pedestal when the case main body 11 is placed on the upper surface 20*u* of the FCPC 20. The support portion 11*f* may be formed integrally with the case main body 11. The support portion 11*f* may have a flange shape.

The case main body 11 is a cast product of a metal material, such as aluminum. The upper wall 11*u* and the lower wall 11*b* are formed by removing a mold in a removal direction RD indicated by the arrow. In order to facilitate the removal of the mold, a draft angle is formed such that the height of the internal space IS of the case main body 11 in the vertical direction (the vertical direction on the paper surface) increases as a distance to the opening 11*a* decreases. As a result, the lower wall 11*b* has a casting angle CA1 with respect to the removal direction RD. Further, the upper wall flu has a casting angle CA2 with respect to the removal direction RD. The sizes of the casting angles CA1, CA2 are not particularly limited. Further, the casting angles CA1, CA2 may be different.

The fuel cell stack 14 is disposed on the inner wall of the lower wall 11*b*. Therefore, an inclination angle TA1 of the stacking direction LD with respect to the horizontal direction HD is equal to the casting angle CA1 of the lower wall 11*b*. That is, the stacking direction LD is inclined to be displaced downward with respect to the horizontal direction HD as a distance to the discharge pipe decreases provided in the stack manifold 12 (that is, as moving toward the rearward of the vehicle). As a result, the generated water by gravity can be easily discharged.

The upper surface of the upper wall flu is inclined to be displaced upward with respect to the horizontal direction HD as a distance to the discharge pipe decreases provided in the stack manifold 12 (that is, as moving toward the rearward of the vehicle). In the present example, an inclination angle TA2 of the upper wall flu with respect to the horizontal direction HD is equal to the casting angle CA2.

The stack manifold 12 is a piping component that supplies hydrogen, air, coolant, and the like to the fuel cell stack 14. The stack manifold 12 is a component integrally molded with a complex 3D-shaped aluminum casting component and resin that constitutes various pipes. Since the stack manifold 12 cannot be molded at the same time as the case main body 11, the stack manifold 12 needs to be formed as a separate component and then attached to the opening 11*a*. The stack manifold 12 is attached to the opening 11*a* by a bolt that is not shown and the like. The stack manifold 12 also functions as a lid that covers the opening 11*a*.

The stack manifold 12 includes a cooling-purpose refrigerant supply pipe and discharge pipe, a fuel gas supply pipe, a fuel off-gas discharge pipe, an oxidant gas supply pipe, an oxidant off-gas discharge pipe, and the like. In the cross-sectional view of FIG. 1, a supply pipe 12*p*1 of fuel gas and a discharge pipe 12*p*2 of fuel off-gas are exposed. Since the fuel off-gas contains generated water, the discharge pipe 12*p*2 of fuel off-gas also functions as a discharge pipe that discharges the generated water from the interior of the case main body 11.

The seal 13 is disposed between the opening 11*a* and the stack manifold 12. The seal 13 can improve the airtightness of the internal space IS. The material of the seal 13 is not particularly limited. Seal 13 may be an O-ring. The opening and the seal are not disposed on the side wall 11*s* facing the stack manifold 12.

Effect

Figure 2:
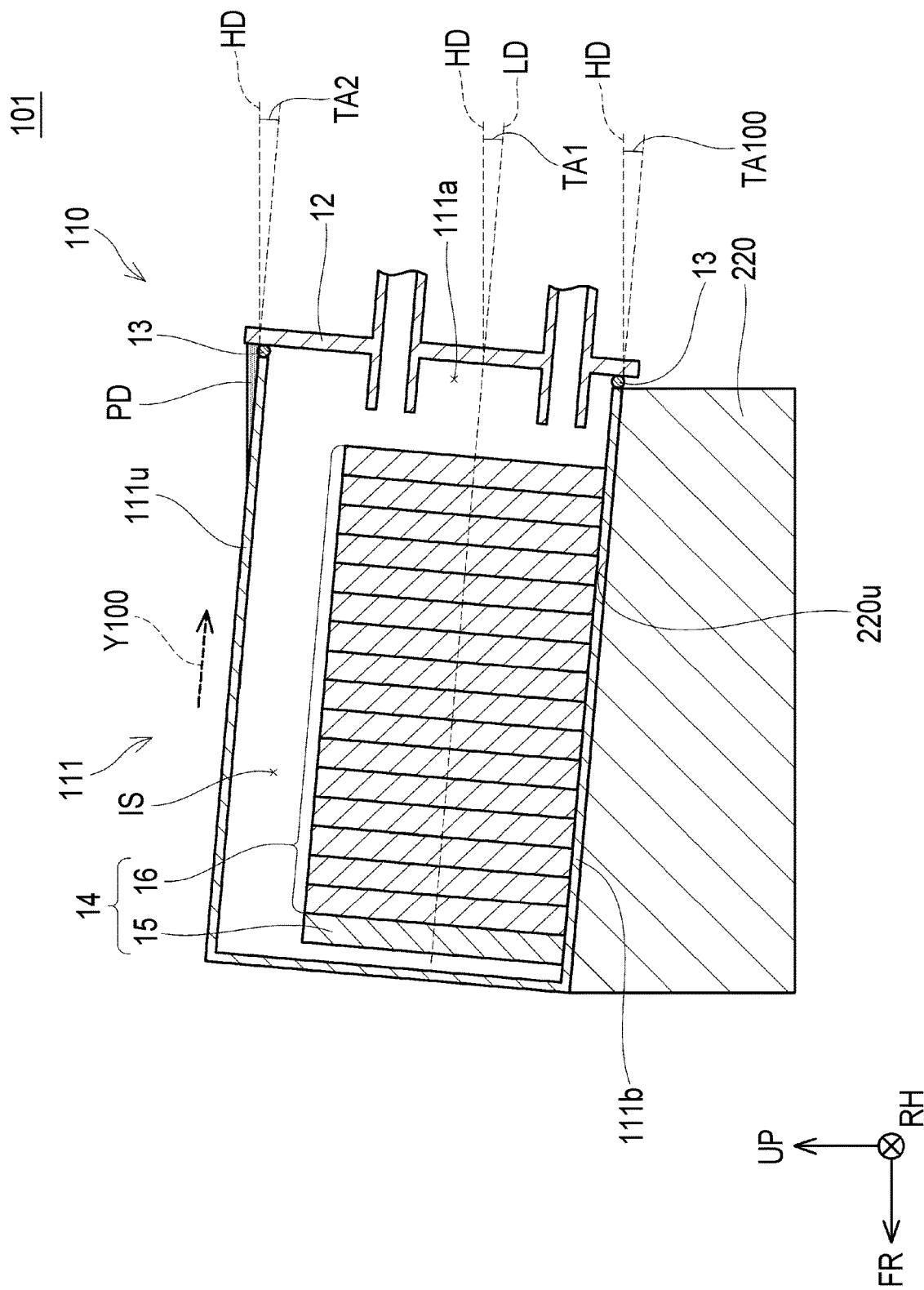
FIG. 2 is a cross-sectional view illustrating a schematic configuration of a fuel cell system of a comparative example.

In a fuel cell system 101 of a comparative example in FIG. 2, an upper surface 220*u* of an FCPC 220 has an equipping inclination angle TA100 with respect to the horizontal direction HD. Therefore, the stack case 110 is disposed with the equipping inclination angle TA100 to be displaced downward as moving toward the rearward of the vehicle. Further, the case main body 111 of the comparative example does not have a casting angle. Since the inclination angle TA1 of the stacking direction LD with respect to the horizontal direction HD has the same inclination angle as the equipping inclination angle TA100, the generated water can be easily discharged by gravity. The inclination angle TA2 of the upper wall flu with respect to the horizontal direction HD also has the same inclination angle as the equipping inclination angle TA100. That is, the upper surface of an upper wall 111*u* is inclined to be displaced downward with respect to the horizontal direction HD as a distance to the discharge pipe decreases provided in the stack manifold 12 (that is, as moving toward the rearward of the vehicle). Various kinds of water, such as rainwater and water splashed up from tires, may enter the upper portion of the stack case 10. The water that has reached the upper surface of the upper wall 111*u* moves toward the stack manifold 12 by gravity (see an arrow Y100). As a result, a puddle PD may be formed in the vicinity of the seal 13. There is a possibility that the seal 13 deteriorates due to the puddle PD.

On the other hand, in the fuel cell system 1 of the present example shown in FIG. 1, the upper surface of the upper wall flu is inclined to be displaced upward with respect to the horizontal direction HD as a distance to the discharge pipe decreases provided in the stack manifold 12. As a result, the water that has reached the upper surface of the upper wall flu can be moved by gravity to the side wall 11*s* on the opposite side of the end at which the opening 11*a* is formed (see arrow Y2). Since the puddle PD can be curbed from being formed in the vicinity of the seal 13, deterioration of the seal 13 can be suppressed.

Example 2

Figure 3:
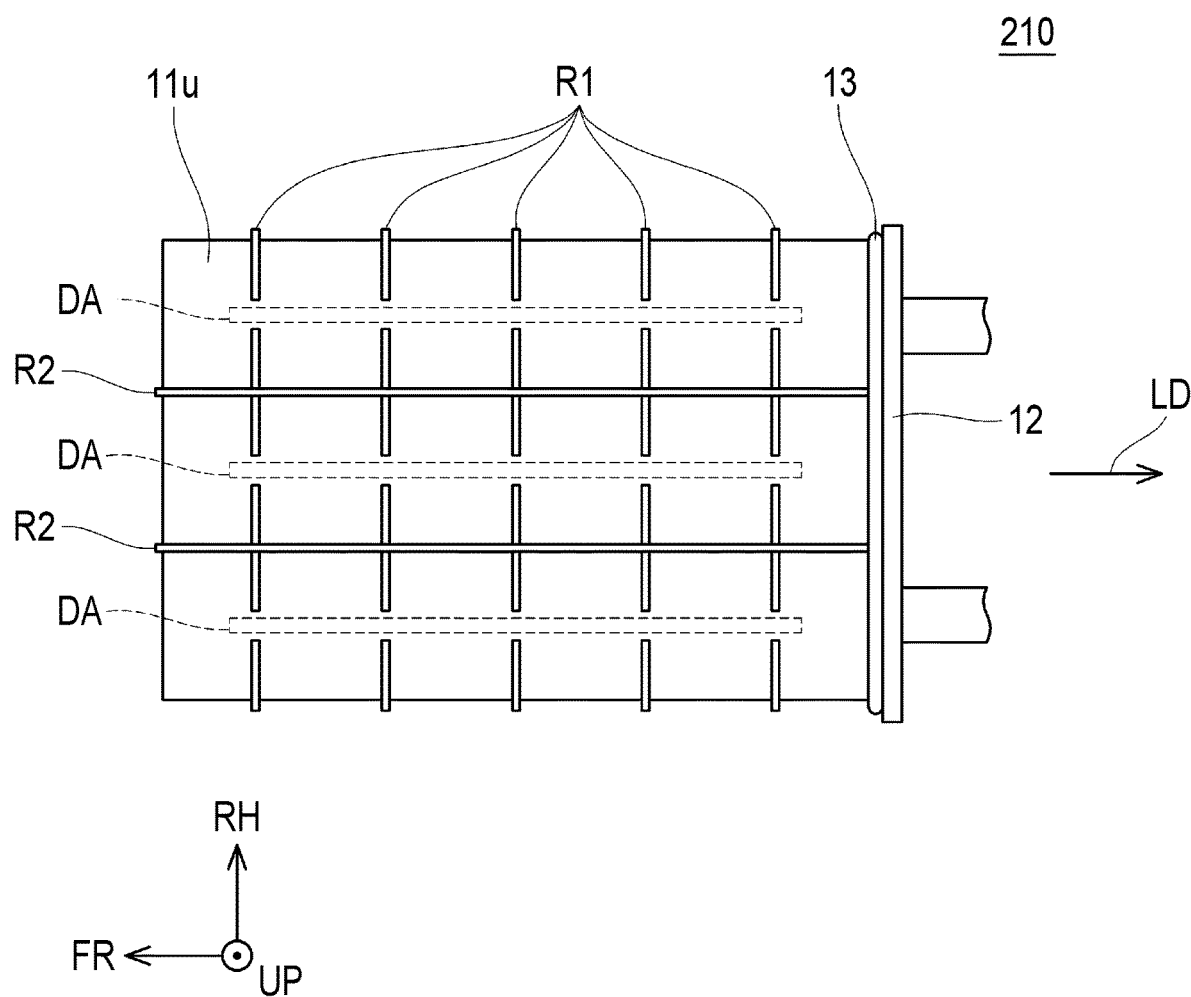
FIG. 3 is a top view of a stack case according to Example 2.

FIG. 3 shows a top view of a stack case 210 according to Example 2. The stack case 210 of Example 2 differs from the stack case 10 of Example 1 in that ribs are provided on the upper surface of the upper wall 11u. Elements that are common between the stack case 210 of Example 2 and the stack case 10 of Example 1 are denoted by the same reference numerals, and description thereof is omitted.

A plurality of ribs R1 extending in a direction crossing the stacking direction LD and a plurality of ribs R2 extending in a direction parallel to the stacking direction LD are formed on the upper surface of the upper wall 11u. The ribs R1 and R2 are wall-shaped projection portions. The ribs R1 and R2 may be formed integrally with the upper wall 11u.

Each of the ribs R1 is partially formed with a drainage area DA having a reduced height. A drainage path can be formed by connecting the drainage areas DA adjacent to each other in the stacking direction LD. As a result, the strength of the stack case 210 can be improved by forming the ribs and the drainage from the upper surface of the upper wall flu can be improved at the same time.

Although specific examples of the disclosure have been described in detail above, these are merely examples and do not limit the scope of the claims. The techniques described in the claims include various modifications and changes of the specific examples exemplified above. The technical elements described in the present specification or the drawings exhibit technical usefulness alone or in various combinations, and are not limited to the combinations described in the claims at the time of filing. Further, the techniques exemplified in the present specification or the drawings achieve a plurality of objectives at the same time, and achieving one of the objectives itself has technical usefulness.

Modification Example

Figure 4:
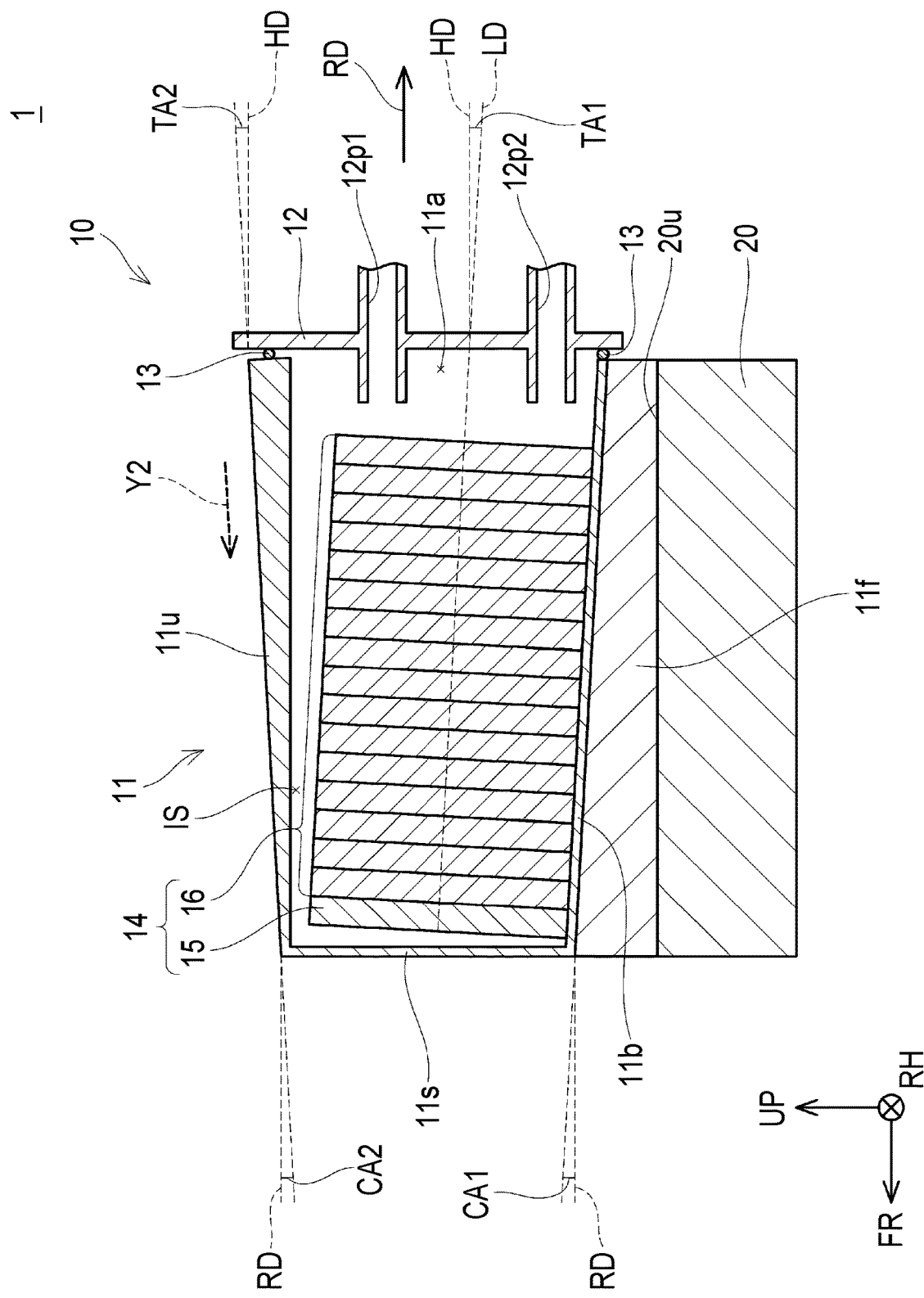
FIG. 4 is a cross-sectional view illustrating a schematic configuration of a fuel cell system according to a modification example.

As shown in FIG. 4, the thickness of the upper wall flu in the vertical direction of the vehicle may change to be thicker as a distance to the discharge pipe decreases provided in the stack manifold 12. Also with such a structure, the upper surface of the upper wall flu can be inclined to be displaced upward with respect to the horizontal direction HD as a distance to the discharge pipe decreases.

The stack case 10 in FIG. 1 may be disposed on the upper surface 220u in FIG. 2 of the FCPC 220 having the equipping inclination angle TA100 described in the comparative example. That is, the stack case 10 may be disposed with the equipping inclination angle TA100 with respect to the horizontal direction such that the position on the side of the opening 11a is lower. In this case, the casting angle CA2 of the upper wall flu may be disposed to be larger than the equipping inclination angle TA100. As a result, the upper surface of the upper wall 11u can be inclined to be displaced downward with respect to the horizontal direction HD as a distance to the discharge pipe decreases provided in the stack manifold 12 (that is, as moving toward the rearward of the vehicle).

Another member (for example, the FCPC 20) may be disposed on the upper surface of the upper wall 11u.

Various materials and molding methods may be used for the case main body 11. For example, the case main body 11 may be manufactured by molding plastic, such as fiber-reinforced plastic.

The stack manifold 12 is an example of a lid.

What is claimed is:

1. A stack case housing a plurality of fuel cells in a stacked state, the stack case comprising:
 a case main body including an opening, the opening being at one end of the case main body in a stacking direction of the fuel cells;
 a lid configured to cover the opening and including a discharge pipe configured to discharge generated water from an interior of the case main body; and
 a seal disposed between the opening and the lid,
 wherein the stack case is configured to be disposed in a vehicle such that
  (i) the stacking direction is inclined downward with respect to a horizontal direction as a distance to the discharge pipe decreases, and
  (ii) an upper surface of the case main body is inclined upward with respect to the horizontal direction as a distance to the discharge pipe decreases.

2. The stack case according to claim 1, wherein the stack case is configured to be disposed in the vehicle such that a lower surface of the case main body is inclined downward with respect to the horizontal direction as a distance to the discharge pipe decreases.

3. The stack case according to claim 1, wherein a thickness of a wall constituting the upper surface of the case main body in a vertical direction of the vehicle increases as a distance to the discharge pipe decreases.

4. The stack case according to claim 1, wherein:
 the case main body is a cast product;
 a draft angle is formed in the interior of the case main body such that a vertical direction height of space of the interior increases as a distance to the discharge pipe decreases; and
 when the stack case is disposed in the vehicle with an inclination angle with respect to the horizontal direction such that a position on a side of the discharge pipe is lower than the horizontal direction, an angle of the draft angle is greater than the inclination angle.

5. The stack case according to claim 1, wherein:
 a rib extending in a direction crossing the stacking direction is formed on the upper surface of the case main body; and
 the rib is configured such that a height of a portion of the rib is lower than a height of the other portion of the rib.

\* \* \* \* \*